Patented Apr. 1, 1952

2,591,479

UNITED STATES PATENT OFFICE 2,591,479

METHOD OF AND SOLUTION FOR COATING SURFACES CHIEFLY OF ZINC

Herbert K. Ward, Birmingham, Mich., assignor to Parker Rust Proof Company, Detroit, Mich.

No Drawing. Application May 12, 1947, Serial No. 747,584

12 Claims. (Cl. 148—6.17)

An object of this invention is to produce phosphate coatings on surfaces which are predominantly zinc by a solution and method which will operate on a wide variety of surfaces, some of which are hard to coat by the phosphate coating solutions customarily employed in the past, and preferably by a solution and method which will coat surfaces predominantly iron, when desired, and with a coating which will form a good paint base.

Other objects and details of the invention will appear as the description proceeds.

It has been long appreciated that a phosphate coating on predominantly zinc surfaces is frequently desirable, especially where the surface is to be painted. Surfaces of galvanized metal with bright spangles, some zinc alloys, especially those containing aluminum, and other specially prepared surfaces which are predominantly zinc, are difficult to coat satisfactorily with phosphate coating solutions generally employed hitherto. Under some circumstances there is too little attack on the metal and little or no coating is formed. Under other circumstances the coating may be chemically incompatible with the paint or may be loose or non-adherent and unsatisfactory as a base for paint. It sometimes happens that different varieties of predominantly zinc surfaces are treated in the same factory, and sometimes it is most convenient to coat some iron surfaces also in the solution employed to coat zinc.

For the foregoing reasons it is advantageous to employ a solution and method which will satisfactorily coat a very wide variety of predominantly zinc surfaces, and sometimes one which will coat iron also. My invention provides such a solution and process.

In the improved process, a combination of certain ingredients in certain proportions is employed. Each of these ingredients has been employed or suggested previously for use in producing phosphate coatings, but the particular combination and proportions which are necessary to produce the satisfactory general-purpose zinc coating solution and method have not been known hitherto.

The new and improved results are achieved by adding to an aqueous solution of zinc dihydrogen phosphate, a soluble salt of nickel, sodium fluoborate, and preferably also a nitrate, and/or a nitrite.

One specific example is an aqueous solution of zinc dihydrogen phosphate sufficient to afford in the solution about 0.3% Zn and about 1.0% $PO_4$. To this is added sufficient nickel sulphate to introduce 0.3% nickel into the solution. 0.3% $NaBF_4$ and sufficient nitrate to introduce about 0.3% $NO_3$ into the solution. The nitrate may be added as sodium nitrate or as zinc nitrate as desired to control the proportion of zinc to $PO_4$ in the solution, and similarly an equivalent amount of zinc fluoborate may be used if desired.

Predominantly zinc surfaces immersed in such a solution for one minute at 150° F. receive a satisfactory paint bonding coating, and under favorable circumstances much less time is sufficient, 15 seconds being recommended for general use. This is true not only of electroplate, but also of galvanized metal and variously treated predominantly zinc surfaces, including those containing sufficient aluminum to interfere with the successful use of phosphate coating solution hitherto used. Also a coating is produced on iron surfaces included for treatment.

The same solution may be sprayed upon or flowed over the surfaces with similar results. The temperature and time may be varied considerably in accordance with well-known practice.

The presence of some nickel aids materially in widening the range of satisfactory use of the solution, and improves the character of the coating on even the most easily coated zinc surfaces. The effect of the nickel increases noticeably until as much as 0.2% nickel is added, and further increase up to 0.3% nickel results in some improvement over the 0.2%, but not as noticeable as additions below the 0.2% proportion. Increase of nickel above 0.3% up to at least 0.5% does not do any harm, but likewise does not effect any appreciable improvement. Since increase of nickel increases the cost of treatment, there is no point in going above 0.3% nickel, except as a safety measure to guard against going below that point, and there is some evidence that too great an excess of nickel may be injurious from the standpoint of paint adhesion. Therefore the nickel content should be at least 0.2% to gain the major advantage from the use of nickel, and should be at least 0.3% to gain full advantage of that ingredient.

The fluoborate increases the etching tendency of the solution and is of especial assistance in securing coatings on zinc containing some aluminum, as well as being of general assistance in coating a wide variety of surfaces. It has been found that about 0.3% of the fluoborate gives the best results, especially as to paint adherence, and that distinctly inferior results are noted on some kinds of surfaces when the fluoborate content is below 0.2% or above 0.4%. When nitrate is absent, greater amounts of fluoborate do no harm.

The nitrate is especially helpful in producing within a short time the desirable even continuous coating of pleasing appearance and greatest utility. The effect of the nitrate in producing a better coating in a given time interval continues up to about 1% $NO_3$ without determimental effects, but as much as 2% $NO_3$ tends to impair paint adhesion. The major beneficial effects are gained with 0.3% $NO_3$, and that is considered the best amount, though from 0.2% to 1% gives some benefit from the $NO_3$.

The above statements as to beneficial and preferred amounts of the three ingredients, nickel, fluoborate and nitrate, apply to their combined use. The effects of the combination of the three are different from the sum of their separate effects, since the use of one has a noticeable effect upon the operation of each of the others. For example, the effect of nitrate, used alone, is progressive with increased amounts. With 0.3% $NaBF_4$ and 0.05% Ni, the addition of 0.3% $NO_3$ is detrimental to paint adhesion. With 0.3% $NaBF_4$ and 0.3% Ni, the addition of 0.3% $NO_3$ is beneficial to paint adhesion, a result that certainly could not be foreseen. In fact, variations due to adding varying amounts of any one of the ingredients with the other two present are very different from the variations due to different amounts of the same material with one or with both of the other ingredients absent. The foregoing disclosure as to optimum quantities must be considered as applying only to the combination of the three named ingredients in a zinc phosphate coating bath or its equivalent.

The use of nickel and fluoborate in amounts as great as 0.2%, even without the nitrate, will produce in time a satisfactory coating on some surfaces which the solution will not coat satisfactorily when either the nickel or fluoborate is absent, but the nitrate gives the added benefit of producing a satisfactory coating in a short time, and improves the quality of the coating for some purposes, so that, while the combination of nickel and fluoborate is of some advantage without the nitrate, the combination of the three ingredients is needed for the complete benefit. In the absence of nitrate, either nickel or fluoborate may be increased indefinitely without detriment.

Even where nitrate is to be used, it is sometimes advantageous to prepare a make-up solution comprising the phosphate, nickel and fluoborate, and add the nitrate or not, as desired.

Instead of nitrate an effectively equivalent amount of nitrite may be employed. This is especially desirable when appreciable amounts of iron surfaces are to be coated, as the nitrite works somewhat better in this bath on iron than does nitrate. For ordinary purposes, nitrate is preferred at is is easier to control and maintain at approximately constant effective range. When nitrite is used, an amount of .004% is recommended, and the preferred range is from .002% to .008% $NO_2$.

While it is best to maintain an approximation of the stated proportion of zinc to $PO_4$ in the solution, the amounts as well as proportions of nickel, fluoborate and nitrate and/or nitrite given above apply to a considerable range of percentage of phosphate in the bath, there being no appreciable difference in effects in a solution containing 0.6% zinc from those given above with 0.3% zinc.

While zinc dihydrogen phosphate has been specified in the foregoing, manganese phosphate may be substituted for an equivalent amount of zinc phosphate with some resultant improvement in the coating under some circumstances, since normal manganese phosphate is more resistant to certain chemical reactions than is normal zinc phosphate. However, the substitution of manganese phosphate for zinc phosphate has a tendency to increase the time and/or temperature necessary for producing a satisfactory coating.

When the solution is employed, the different ingredients are depleted at different rates. Since these proportionate rates may vary due to a number of variable causes, some adjustment may be necessary to restore proper balance in the solution, but the following materials in the proportions specified, when dissolved in water, constitute a replenishing solution which will normally keep the solution within an operable range as to the several ingredients, when added to keep the zinc phosphate within working range, and therefore constitutes a valuable replenishing solution.

840 lbs. phosphoric acid 75%
248 lbs. nitric acid 42° Baumé
50 lbs. boric acid
97 lbs. hydrofluoric acid 60%
236 lbs. nickel sulphate ($NiSO_4.7H_2O$)
260 lbs. zinc oxide
39 lbs. sodium carbonate
Sufficient water to dissolve Obviously approximately the same proportion of essential chemicals may be introduced into the replenishing solution by use of other soluble compounds in suitable proportions.

Where nitrate is not used, or where it is not included in the replenishing solution, the solution may be maintained in operative condition by replenishing to keep the $PO_4$ approximately constant with a solution containing chemicals in approximately the proportions resulting from forming an aqueous solution in accordance with the following formula:

350 lbs. 75% $H_3PO_4$
20 lbs. $H_3BO_3$
48 lbs. 48% HF
96 lbs. $NiSO_4.7H_2O$
30 lbs. ZnO
$H_2O$, sufficient to form solution.

Accordingly each of the replenishing solutions indicated above constitutes a valuable chemical solution for commercial use.

While certain ways of carrying out the invention have been quite specifically disclosed and certain variations have been described, other changes may be made within the scope of the invention as defined in the appended claims.

What I claim is:

1. An aqueous solution for coating zinc surfaces, said solution consisting essentially of about 1–2 percent phosphate ion, an ion of the group consisting of the zinc ion and the manganese ion in a proportion to form dihydrogen phosphate with said phosphate ion, at least 0.2 percent nickel ion, and at least 0.16 percent fluoborate ion.

2. An aqueous solution for coating zinc surfaces, said solution consisting essentially of about 1–2 percent phosphate ion, the zinc ion in a proportion to form zinc dihydrogen phosphate with said phosphate ion, at least 0.2 percent nickel ion, and at least 0.16 percent fluoborate ion.

3. An aqueous solution for coating zinc surfaces, said solution consisting essentially of acid zinc phosphate, about 0.3 percent nickel ion, about 0.16-0.32 percent fluoborate ion and an oxidizing ion of the group consisting of the nitrate ion and the nitrite ion, said nitrate ion, when present, being in a proportion of about 0.2-1.0 percent and said nitrite ion, when present, being in a proportion of about 0.002-0.008 percent.

4. An aqueous solution for coating zinc surfaces, said solution consisting essentially of about 1-2 percent phosphate ion, an ion of the group consisting of the zinc ion and the manganese ion in a proportion to form dihydrogen phosphate with said phosphate ion, about 0.3 percent nickel ion, about 0.24 percent fluoborate ion, and about 0.3 percent nitrate ion.

5. The method for coating zinc surfaces which comprises the step of treating the surface with an aqueous solution which consists essentially of about 1-2 percent phosphate ion, an ion of the group consisting of the zinc ion and the manganese ion in a proportion to form dihydrogen phosphate with said phosphate ion, at least 0.2 percent nickel ion and at least 0.16 percent fluoborate ion.

6. The method for coating zinc surfaces which comprises the step of treating the surface with an aqueous solution which consists essentially of acid zinc phosphate, about 0.3 percent nickel ion, about 0.16-0.32 percent fluoborate ion and an oxidizing ion of group consisting of the nitrate ion and the nitrite ion said nitrate ion, when present, being in a proportion of about 0.2-1.0 percent and said nitrite ion, when present, being in a proportion of about 0.002-0.008 percent.

7. The method for coating zinc surfaces which comprises the step of treating the surface with an aqueous solution which consists essentially of about 1-2 percent phosphate ion, an ion of the group consisting of the zinc ion and the manganese ion in a proportion to form dihydrogen phosphate with said phosphate ion, about 0.3 percent nickel ion, about 0.24 percent fluoborate ion, and about 0.3 percent nitrate ion.

8. A solution for replenishing the phosphate coating solution of claim 2, said replenishing solution comprising as essential ingredients:

350 lbs. 75% $H_3PO_4$
20 lbs. $H_3BO_3$
48 lbs. 48% HF
96 lbs. $NiSO_4.7H_2O$
30 lbs. ZnO
$H_2O$ sufficient to form a solution 9. A solution for replenishing the phosphate coating solution of claim 2 said replenishing solution comprising as essential ingredients:

840 lbs. phosphoric acid 75%
248 lbs. nitric acid 42% Baumé
50 lbs. boric acid
97 lbs. hydrofluoric acid 60%
236 lbs. nickel sulphate ($NiSO_4.7H_2O$)
260 lbs. zinc oxide
39 lbs. sodium carbonate
$H_2O$ sufficient to form a solution 10. A composition for coating zinc surfaces, the essential coating producing ingredients of said composition being:

100 lbs. $Zn(H_2PO_4)_2.2H_2O$
About 23 lbs. $H_3PO_4$ (75%)
At least 78 lbs. $NiSO_4.7H_2O$
At least 16 lbs. $NaBF_4$ 11. A composition for coating zinc surfaces, the essential coating producing ingredients of said composition being:

100 lbs. $Zn(H_2PO_4)_2.2H_2O$
About 23 lbs. 75% $H_3PO_4$
About 120 lbs. $NiSO_4.7H_2O$
16 to 32 lbs. $NaBF_4$
39 to 195 lbs. $Zn(NO_3)_2.6H_2O$
25 to 1.0 lbs. $NaNO_2$ 12. A composition for coating zinc surfaces, the essential coating producing ingredients of said composition being:

100 lbs. $Zn(H_2PO_4)_2.2H_2O$
About 23 lbs. $H_3PO_4$
About 120 lbs. $NiSO_4.7H_2O$
About 24 lbs. $NaBF_4$
About 60 lbs. $Zn(NO_3)_2.6H_2O$

HERBERT K. WARD.

REFERENCES CITED

The following references are of record in the file of this patent:

UNITED STATES PATENTS

| Number | Name | Date |
|---|---|---|
| 1,911,726 | Tanner et al. | May 30, 1933 |
| 2,121,574 | Romig | June 21, 1938 |
| 2,276,353 | Thompson | Mar. 17, 1942 |
| 2,296,844 | Glasson | Sept. 29, 1942 |
| 2,312,855 | Thompson | Mar. 2, 1943 |
| 2,500,673 | Gibson et al. | Mar. 14, 1950 |